US008168691B2

(12) United States Patent
Houle et al.

(10) Patent No.: US 8,168,691 B2
(45) Date of Patent: May 1, 2012

(54) VINYL ETHER RESIST FORMULATIONS FOR IMPRINT LITHOGRAPHY AND PROCESSES OF USE

(75) Inventors: Frances A. Houle, Fremont, CA (US); Taiichi Furukawa, Sunnyvale, CA (US)

(73) Assignees: International Business Machines Corporation, Armonk, NY (US); JSR Corporation (JP)

( * ) Notice: Subject to any disclaimer, the term of this patent is extended or adjusted under 35 U.S.C. 154(b) by 98 days.

(21) Appl. No.: 12/367,654

(22) Filed: Feb. 9, 2009

(65) Prior Publication Data

US 2010/0201043 A1    Aug. 12, 2010

(51) Int. Cl.
 *C09D 4/00*  (2006.01)
 *G03F 7/00*  (2006.01)

(52) U.S. Cl. .............. 522/181; 522/59; 522/75; 522/79; 430/281.1; 430/288.1

(58) Field of Classification Search .................... 522/31, 522/32, 75, 79, 181, 59; 430/269, 281.1, 430/288.1
See application file for complete search history.

(56) References Cited

U.S. PATENT DOCUMENTS

| | | | |
|---|---|---|---|
| 5,070,117 A | 12/1991 | Klemarczyk et al. | |
| 5,506,087 A | 4/1996 | Lapin et al. | |
| 5,648,194 A | 7/1997 | Pai et al. | |
| 5,650,261 A | 7/1997 | Winkle | |
| 5,876,900 A * | 3/1999 | Watanabe et al. | 430/288.1 |
| 6,072,006 A * | 6/2000 | Bantu et al. | 525/262 |
| 6,416,928 B1 | 7/2002 | Ohsawa et al. | |
| 6,913,867 B2 | 7/2005 | Imai | |
| 7,306,853 B2 | 12/2007 | Lin et al. | |
| 7,358,028 B2 | 4/2008 | Maruyama et al. | |
| 7,393,624 B2 | 7/2008 | Allen et al. | |
| 7,419,611 B2 | 9/2008 | DiPietro et al. | |
| 7,488,771 B2 | 2/2009 | Houle et al. | |
| 7,749,422 B2 * | 7/2010 | Allen et al. | 264/496 |
| 8,025,833 B2 * | 9/2011 | Kodama et al. | 264/496 |
| 2002/0013380 A1 | 1/2002 | Chappelow et al. | |
| 2004/0116548 A1 | 6/2004 | Willson | |
| 2007/0051697 A1 * | 3/2007 | DiPietro et al. | 216/52 |
| 2007/0066750 A1 | 3/2007 | Houle et al. | |
| 2007/0298176 A1 | 12/2007 | DiPietro et al. | |
| 2008/0174051 A1 | 7/2008 | DiPietro et al. | |
| 2008/0241418 A1 | 10/2008 | Allen et al. | |
| 2009/0092767 A1 * | 4/2009 | Houle et al. | 427/510 |

OTHER PUBLICATIONS

E.K. Kim, et al. "Vinyl ether formulations for step and flash imprint lithography", J. Vac. Sci. Technol. B23(6), Nov./Dec. 2005, 2005 American Vacuum Society, pp. 2967-2971.

(Continued)

*Primary Examiner* — Susan W Berman
(74) *Attorney, Agent, or Firm* — Cantor Colburn LLP

(57) ABSTRACT

Coating compositions suitable for UV imprint lithographic applications are disclosed that include at least one vinyl ether crosslinker having at least two vinyl ether groups; at least one diluent comprising a monofunctional vinyl ether compound; and at least one photoacid generator soluble in a selected one or both of the at least one monofunctional ether compound and the at least one vinyl ether compound, wherein the at least one monofunctional ether compound and the at least one vinyl ether compound are free from fluorine and silicon substituents. Also disclosed are imprint processes.

13 Claims, 2 Drawing Sheets

100% DEGDVE resist on Si, manual imprint

100% DEGDVE resist on Si, imprio imprint

OTHER PUBLICATIONS

E.K. Kim, et al., "Vinyl ethers in ultraviolet curable formulations for step and flash imprint lithography", J. Vac. Sci. Technol. B22(a), Jan./Feb. 2004, 2004 American Vacuum Society, pp. 131-135.

Hiroshi Ito, et al., "Vinyl ether resist system for UV-cured nanoimprint lithography", undated, 11 pages.

Menger, Fredic M. et al., "A Non-Steroidal Facial Amphiphile", 2006 American Chemical Society, vol. 128, No. 15, dated Feb. 13, 2006, pp. 4960-4961.

* cited by examiner

100% DEGDVE resist on
Si, manual imprint

100% DEGDVE resist on
Si, Imprio imprint

VINYL ETHER RESIST FORMULATIONS FOR IMPRINT LITHOGRAPHY AND PROCESSES OF USE

BACKGROUND

This invention relates to process and materials for imprint lithographic applications and more particularly, to vinyl ether based coating compositions suitable for nanoimprint lithography.

Imprint lithography has emerged in various forms as a potential alternative to conventional photolithography because of its ability to print smaller features at low cost. UV-cure nanoimprint lithography is a variant of imprint lithography that is amenable to the resolution and overlay requirements necessary for the fabrication of advanced semiconductor devices. In UV-cure nanoimprint lithography, a low-viscosity photosensitive molding material is molded between a mechanically rigid template having a relief pattern and a substrate, and then is exposed to actinic radiation. The resulting hardened layer, having a three dimensional pattern, can for example be used as an etch mask to transfer the imprinted pattern into the substrate below. Other applications are also possible.

Imprint lithography requires low volatility and low viscosity resists to obtain high quality patterned films with uniform composition within the minimum possible cycle time. The composition of the curable material is of critical importance because its components affect the degree of cure, adhesion to the template surface, adhesion to the bottom surface, cohesive strength of the cured material, and the dimensional stability of the imprinted features. Vinyl ether based resists are attractive chemical systems for this purpose because they have low volatility, low viscosity, and also because these materials have very rapid cure rates. Vinyl ether based resist formulations can be cationically cured upon exposure to actinic radiation and the cure chemistry is not affected by free radical traps such as oxygen, thereby reducing the sensitivity of the process to ambient air. Vinyl ether based resists are sensitive to ambient base, however, and their reactions can be inhibited by water vapor.

Prior art cationically curable vinyl ether based imprint resist systems typically contain a difunctional silicon-containing vinyl ether crosslinker, a photoacid generator (PAG), an optional reactive monofunctional vinyl ether diluent, and a sensitizer/stabilizer additive such as 9-anthracene methanol. The silicon-containing difunctional vinyl ether crosslinkers are commonly used for etch barrier and reverse tone patterned bottom layer applications. Some prior art vinyl ether resist formulations that do not contain silicon-containing difunctional crosslinkers include aromatic vinyl ether formulations that are either 100% crosslinker without a diluent or include up to about 20% fluorinated vinyl ethers or other fluorinated non-VE compounds as the diluent. These types of formulations are often used for reverse tone bottom layer applications. Although initially thought to be beneficial for release of the cured resist from the nanoimprint template, these fluorinated components have been found to be highly volatile and to evaporate from the uncured resist formulation.

The PAG, which is typically a solid material, or other solid additives such as the sensitizer in the vinyl either resist formulations are typically chosen to be completely soluble in the crosslinker as well as the diluent. If the PAG or other solid additives such as 9-anthracene methanol are not soluble in the vinyl ethers or only slightly soluble, the solid material present in the resist will cause roughness and inhomogeneity in the cured material. Hard PAG or additive particles can potentially damage the surface of the template. Moreover, if the solids are removed by filtration little or no PAG (or solid additive) may be left in the formulation. Still further, it is possible that the PAG solids can precipitate out. In addition, a requirement for filtration to remove undissolved PAG solids will cause the composition of the formulation to be hard to control. There are contradictory reports on solubility of various components. Successful preparation of a Si-containing 80% crosslinker formulation with a PAG soluble in only one of the VE components has been described but subsequent work showed that the PAG used was not soluble in a similar formulation. In that work use of a mixture of 2 vinyl ethers with a PAG soluble in only one resulted in PAG precipitation on standing.

Figure 1:
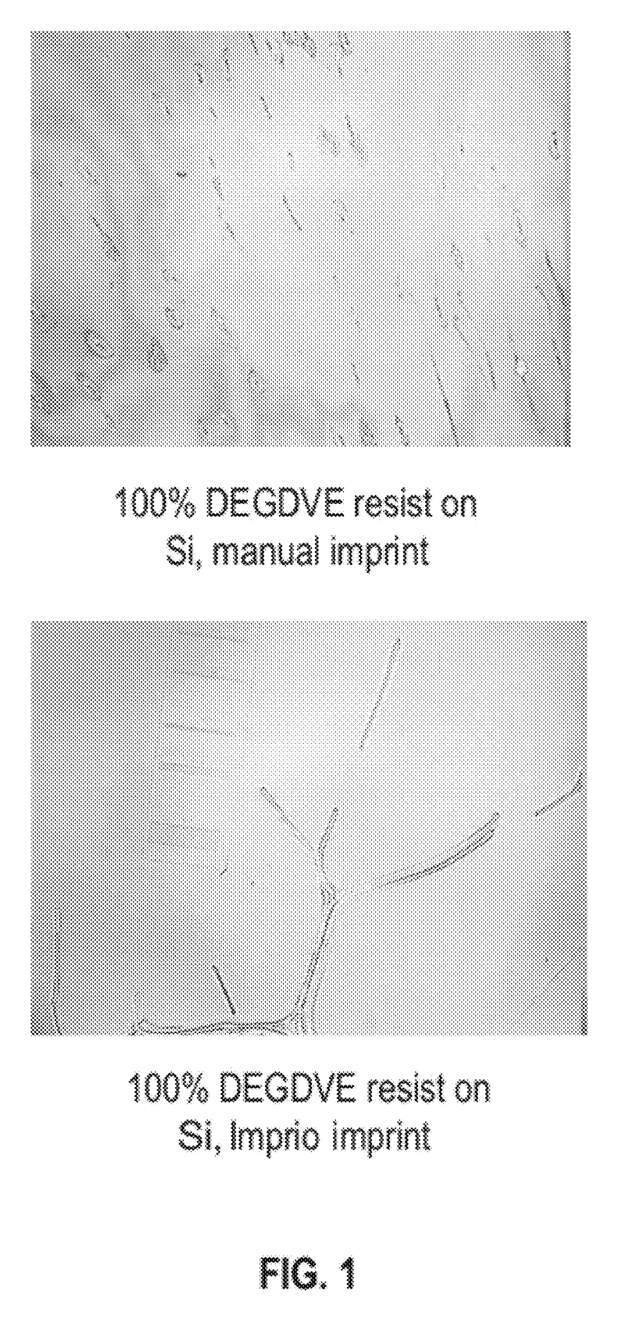
FIG. 1 pictorially illustrates micrographs of a manually imprinted and tool imprinted vinyl ether resist cured film, wherein the vinyl ether resist formulation included 100% crosslinker.

There are a number of problems with the prior art resist formulations for imprint applications. Formulations that include 100% crosslinker make very poor quality films in general. Micrographs of a cured film of the prior art compound diethyleneglycol divinylether are shown in FIG. 1. The resist formulation was imprinted manually and using an imprint tool commercially available under the trade name Imprio from Molecular Imprints, Inc. The resulting cured films are highly stressed, and tend to buckle and form fissures. The all organic films have a greater tendency to buckle, while occasionally some 100% and 50% crosslinker Si-containing resists can be of better quality. There is no guidance on use of vinyl ethers with functionality greater than 2 to make good films. The sensitizer/stabilizer and PAGs are not universally soluble in vinyl ethers, which limit the potential resist components. The preferred soluble PAGs such as CGI 1906 and 1907 are heavily fluorinated. The large degree of fluorination makes the PAG segregate to hydrophobic surfaces (e.g., the air interface) according to XPS measurements, thus limiting dispersion in the resist and making material uniformity hard to control.

Accordingly, there is a need in the art for improved vinyl ether resists suitable for imprint applications that provide cured films that are smooth and free of buckling, cracks, and pinholes.

SUMMARY

The shortcomings of the prior art are overcome and additional advantages are provided through the provision of a coating composition comprising at least one vinyl ether crosslinker having at least two vinyl ether groups; at least one diluent comprising a monofunctional vinyl ether compound; and at least one photoacid generator soluble in a selected one or both of the at least one monofunctional vinyl ether compound and the at least one vinyl ether crosslinker having the at least two vinyl ether groups, wherein the least one monofunctional vinyl ether compound and the at least one vinyl ether crosslinker having the at least two vinyl ether groups are free from silicon and fluorine substituents.

In another embodiment, the coating composition comprises at least one aliphatic vinyl ether crosslinker having at least two vinyl ether groups; at least one diluent comprising a monofunctional vinyl ether compound; and at least one photoacid generator soluble in a selected one or both of the at least one monofunctional ether compound and the at least one aliphatic vinyl ether crosslinker, wherein the at least one monofunctional ether compound and the at least one aliphatic vinyl ether crosslinker are free from silicon and fluorine substituents, and wherein the composition has a viscosity of less than or equal to 100 centipoise at 295° Kelvin.

An imprint process comprises coating a substrate with a vinyl ether resist formulation comprising at least one vinyl ether crosslinker having at least two vinyl ether groups, at least one diluent comprising a monofunctional vinyl ether compound, and at least one photoacid generator soluble in a selected one or both of the at least one monofunctional ether compound and the at least one organic vinyl ether compound having the at least two vinyl ether groups, wherein the at least one vinyl ether crosslinker and the at least one diluent comprising a monofunctional vinyl ether compound are free from silicon and fluorine substituents, and wherein the composition has a viscosity of less than or equal to 100 centipoise at 295° Kelvin; pressing a template having a relief image onto the vinyl ether resist formulation; photocationically curing the vinyl ether resist formulation to form a solidified reverse image replica of the relief pattern in the template; and releasing the template from the cured vinyl ether resist formulation.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Disclosed herein are organic vinyl ether based resist formulations suitable for nanoimprint applications that provide improved control over the film properties, overcoming problems noted in the prior art. The organic vinyl ether resist formulations generally include at least one vinyl ether crosslinker having at least two vinyl ether groups; at least one diluent comprising a monofunctional vinyl ether compound; and at least one photoacid generator soluble in a selected one or both of the at least one monofunctional vinyl ether diluent and the at least one vinyl ether crosslinker having the at least two vinyl ether groups, wherein the at least one vinyl ether crosslinker and the at least one monofunctional vinyl ether diluent are free from silicon and fluorine. In one embodiment, the composition has a viscosity of less than or equal to 100 centipoise at 295° Kelvin. In other embodiments, the composition has a viscosity of less than or equal to 15 centipoise at 295° Kelvin, and in still other embodiments, the composition has a viscosity of less than or equal to 5 centipoise at 295° Kelvin.

Applicants have discovered that photoacid solubility in a selected one or both of the at least one monofunctional vinyl ether diluent and the at least one vinyl ether crosslinker provides increased versatility in resist formulation. Moreover, the use of monofunctional vinyl ether diluents in combination with the multifunctional vinyl ether crosslinkers provides the formulator with increased tools for manipulating film properties than previously possible. Film properties such as adhesion, smoothness, the number of film defects, and the like, can be optimized without placing solubility constraints on every vinyl ether component.

As discussed above, the organic vinyl ether curable resist formulations include at least one mono functional vinyl ether diluent free from a silicon and a fluorine substituent, wherein the at least one monofunctional vinyl ether diluent has a single vinyl ether group ($CR_2$=CRO—) which may be represented by the following structure (I):

(I).

The resist composition also includes at least one vinyl ether compound free from a silicon and a fluorine substituent and having at least two vinyl ether groups, wherein the multifunctional vinyl ether may be represented by the following structures (II-IV):

(II)

(III)

(IV)

In formulas (I)-(IV), each m is represented by an integer from 1 to 20, wherein "m" can be arranged in a linear chain or in a cyclic or polycyclic structure. Each n is represented by an integer from 1 to 10, and it is understood that for each of the $C(R^{11})(R^{12})$ groups represented by n, the $R^{11}$ and $R^{12}$ groups are independently selected at each occurrence and are not necessarily the same. The carbon backbone (n C) can be arranged in a linear chain or in a cyclic or polycyclic structure. Each p is represented by an integer from 1 to 10, and it is understood that for each of the $C(R^{23})(R^{24})$ groups represented by p, the $R^{23}$ and $R^{24}$ groups are independently selected at each occurrence and are not necessarily the same. The carbon backbone (p C) can be arranged in a linear chain or in a cyclic or polycyclic structure. Each q is represented by an integer from 1 to 10, and it is understood that for each of the $C(R^{25})(R^{26})$ groups represented by q, the $R^{25}$ and $R^{26}$ groups are independently selected at each occurrence and are not necessarily the same. The carbon backbone (q C) can be arranged in a linear chain or in a cyclic or polycyclic structure. Each r is represented by an integer from 1 to 10. Each s is represented by an integer from 0 to 10, and it is understood that for each of the $C(R^{37})(R^{38})$ groups represented by s, the $R^{37}$ and $R^{38}$ are independently selected at each occurrence and are not necessarily the same. The carbon backbone (s C) can be arranged in a linear chain or in a cyclic or polycyclic structure. Each t is represented by an integer from 1 to 10, and it is understood that for each of the $C(R^{39})(R^{40})$ groups represented by t, the $R^{39}$ and $R^{40}$ groups are independently selected at each occurrence and are not necessarily the same. The carbon backbone (t C) can be arranged in a linear chain or in a cyclic or polycyclic structure. Each u is represented by an integer from 1 to 10, and it is understood that for each of the $C(R^{41})(R^{42})$ groups represented by u, the $R^{41}$ and $R^{42}$ groups are independently selected at each occurrence and are not necessarily the same. The carbon backbone (u C) can be arranged in a linear chain or in a cyclic or polycyclic structure. Each v is represented by an integer from 0 to 10. Each w is represented by integers from 2 to 6.

Each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$, $R^{38}$, $R^{39}$, $R^{40}$, $R^{41}$, and $R^{42}$ ($R^1$-$R^{42}$) may be independently at each occurrence a hydrogen atom or a hydrocarbyl substituent with a primary, a secondary or a tertiary carbon attachment point. The A group is an aromatic group.

The hydrocarbyl substituent may be selected from the group consisting of a linear alkyl or a linear alkoxy group having 1-6 carbon atoms, a branched alkyl or branched alkoxy group having 2-12 carbon atoms, a cycloalkyl, a bicycloalkyl, an aryl group, an aralkyl group, an alkaryl group, an alkenyl group, a cycloalkenyl group, an alkalkenyl group, an alkenylalkyl group, an alkynyl group, an alkalkynyl group, and an alkynylalkyl group. In addition, the hydrocarbyl group may be linked with other R groups to form a carbon ring having 3 to 8 carbon atoms. In other embodiments, each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$, $R^{38}$, $R^{39}$, $R^{40}$, $R^{41}$, and $R^{42}$ ($R^1$-$R^{42}$) may be a hydrocarbyl substituent as noted above or may be a cycloalkoxy or a bicycloalkoxy group having 3-17 carbon atoms, a dihydropyranyl group, a dihydrofuranyl group, a cyanopropyl group or selected from the vinyl ether groups $C(R^{43})(R^{44})C=C(R^{45})OC(R^{46})(R^{47})[C(R^{48})R^{49}]_n$ and $C(R^{50})(R^{51})=C(R^{52})OC(R^{53})(R^{54})[C_p(R^{55})(R^{56})OC_q(R^{57})(R^{58})]_r$, wherein each $R^{43}$, $R^{44}$, $R^{45}$, $R^{46}$, $R^{47}$, $R^{48}$, $R^{49}$, $R^{50}$, $R^{51}$, $R^{52}$, $R^{53}$, $R^{54}$, $R^{55}$, $R^{56}$, $R^{57}$, $R^{58}$ ($R^{43}$-$R^{58}$) may be independently at each occurrence a hydrogen or a hydrocarbyl substituent with a primary, a secondary or a tertiary carbon attachment point, and wherein r and n are as described above.

The coating composition further includes a radiation sensitive photoacid generator (PAG). These PAGs are compounds that generate an acid upon exposure to actinic radiation. In various embodiments, any suitable photoacid generating agent may be used, so long as the selected photoacid generator dissolves sufficiently in the coating composition, and the resulting solution thereof may form a coating on a substrate by a dispensing process, or spin coating, or the like. As is well known to those skilled in the art after reading the present application, the following illustrative classes of photoacid generators may be employed in various embodiments of the present invention.

Typical photoacid generators include, without limitation: (1) sulfonium salts, such as triphenylsulfonium perfluoromethanesulfonate (triphenylsulfonium triflate), triphenylsulfonium perfluorobutanesulfonate, triphenylsulfonium perfluoropentane-sulfonate, triphenylsulfonium perfluorooctanesulfonate, triphenylsulfonium hexafluoroantimonate, triphenylsulfonium hexafluoroarsenate, triphenylsulfonium hexafluorophosphate, triphenylsulfonium bromide, triphenylsulfonium chloride, triphenyl-sulfonium iodide, 2,4,6-trimethylphenyldiphenylsulfonium perfluorobutanesulfonate, 2,4,6-trimethylphenyldiphenylsulfonium benzenesulfonate, tris(t-butylphenyl)sulfonium perfluorooctane sulfonate, diphenylethylsulfonium chloride, and phenacyldimethylsulfonium chloride; (2) halonium salts, particularly iodonium salts, including diphenyliodonium perfluoromethanesulfonate (diphenyliodonium triflate), diphenyliodonium perfluorobutanesulfonate, diphenyliodonium perfluoropentane-sulfonate, diphenyliodonium perfluorooctanesulfonate, diphenyliodonium hexafluoroantimonate, diphenyliodonium hexafluoroarsenate, bis-(t-butylphenyl)-iodonium triflate, and bis-(t-butylphenyl)-iodonium camphanylsulfonate; (3) a, α'-bis-sulfonyldiazomethanes such as bis(p-toluenesulfonyl)diazomethane, methylsulfonyl p-toluenesulfonyldiazomethane, 1-cyclohexylsulfonyl-1-(1,1-dimethylethylsulfonyl)diazomethane, and bis(cyclohexylsulfonyl)diazomethane; (4) trifluoromethanesulfonate esters of imides and hydroxyimides, e.g., α-(trifluoromethylsulfonyloxy)-bicyclo[2.2.1]hept-5-ene-2,3-dicarboximide (MDT); (5) nitrobenzyl sulfonate esters such as 2-nitrobenzyl p-toluenesulfonate, 2,6dinitrobenzyl p-toluenesulfonate, and 2,4-dinitrobenzyl p-trifluoromethylbenzene sulfonate; (6) sulfonyloxynaphthalimides such as N-camphorsulfonyloxynaphthalimide and N-pentafluorophenylsulfonyloxynaphthalimide; (7) pyrogallol derivatives (e.g., trimesylate of pyrogallol); (8) naphthoquinone-4-diazides; (9) alkyl disulfones; (10) s-triazine derivatives; and (11) miscellaneous sulfonic acid generators including t-butylphenyl-α-(ptoluenesulfonyloxy)-acetate, t-butyl-α-(p-toluenesulfonyloxy)acetate, and N-hydroxynaphthalimide dodecane sulfonate (DDSN), and benzoin tosylate.

Additional suitable photoacid generators useful in conjunction with the coating compositions and methods provided herein will be known to those skilled in the art.

By way of example, the PAG of the coating composition may include at least one of the following structures (V-VII):

(V)

(VI)

(VII)

The coating composition may further include an optional stabilizer. Suitable stabilizers include, without limitation, 9-anthracenemethanol, a substituted 9-anthrascenemethanol having the structure (VIII), phenothiazine, a substituted phenothiazine having the structure (IX), and the like.

(VIII)

(IX)

wherein each R is independently selected from the group consisting of a hydrogen atom and a hydrocarbyl substituent with a primary, a secondary or a tertiary carbon attachment point, said hydrocarbyl group selected from the group consisting of an alkyl group having 1 to 20 carbon atoms, an alkenyl group having 1 to 20 carbon atoms, an alkynl group having 1 to 20 carbon atoms, an aralkyl group having 1 to 20 carbon atoms, an alkaryl having 1 to 20 carbon atoms and an aryl group having 1 to 20 carbon atoms; where, the alkyl groups of the aralkyl and the alkaryl groups may be linear, branched or cyclic and the aryl groups may include at least one carbon ring containing 3 to 8 carbon atoms; and where any two R in the same molecule may be linked to form the at least one carbon ring containing 3 to 8 carbon atoms.

The ratio of crosslinker to diluent is approximately 3:7 to 9.5:0.5. In other embodiments, the ratio of crosslinker to diluent is approximately 5:5 to 9.5:0.5; and in still other embodiments, the ratio of crosslinker to diluent is approximately 7:3 to 9.5:0.5.

The photoacid generator approximately is 0.1 to 5 wt % of the total weight of the crosslinker and diluent components; and in other embodiments, the photoacid generator is approximately 0.2 to 3 wt %.

The additives are approximately 0.2 to 6 wt % of the total weight of the crosslinker and diluent components; and in other embodiments, the additives are approximately 0.3 to 5.5 wt %.

In one embodiment, the total crosslinker in the composition is 28.2 to 29.9 wt %, wherein the diluent is 66.0 to 69.9 wt %, and the additives including the photoacid generator is 0.2 to 5.8 wt %. In another embodiment, the total crosslinker in the composition is 47.0 to 49.9 wherein the diluent is 47.0 to 49.9 wt %, and the additives including the photoacid generator is 0.2 to 6.0 wt %. In still another embodiment, the total crosslinker in the composition is 66.0 to 69.9, wherein the diluent is 28.2 to 29.9 wt %, and the additives including the photoacid generator is 0.2 to 5.8 wt %.

Figure 2:
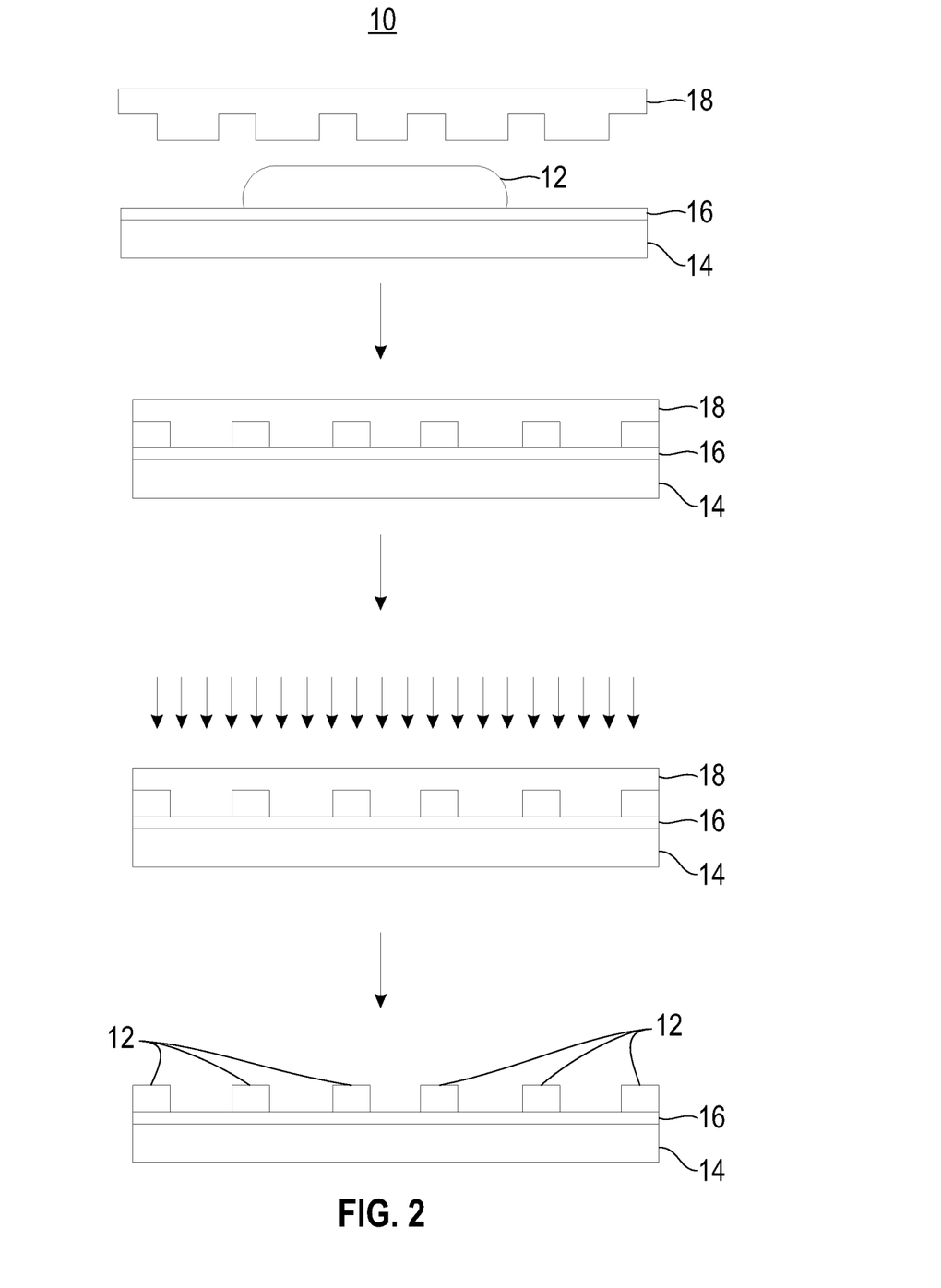
FIG. 2 illustrates an exemplary imprint lithography process.

FIG. 2 illustrates an exemplary imprint process 10 for which the vinyl ether resist formulations can be utilized. The process first includes applying the vinyl ether resist formulation 12 in accordance with the present invention onto a base substrate 14. The base substrate 14 may first be coated with an adhesion promoter 16. A template 18 with nanostructures on its surface and the base substrate 14 are then aligned and the gap between them decreased such that the template 18 is pressed into the applied resist 12. The template can include a release layer (not shown). The vinyl ether resist 12 is then illuminated through the backside of the template 18 with activating radiation 20 to photocationically cure the vinyl ether resist 12. The template 18 is then withdrawn leaving the now cured and imprinted medium with relatively low aspect ratio, high-resolution features representing a solidified reverse image replica of the relief pattern in the template. In practice, a thin uniform residual layer of cured photoresist (not shown) may remain between layer 16 and the imprinted features. The cured and imprinted medium is then etched to form high aspect ratio high resolution features in the base substrate.

The following examples are presented for illustrative purposes only, and are not intended to limit the scope of the invention.

EXAMPLES

In the following examples, cyclohexyl vinyl ether (CHVE), 2-ethylhexyl vinyl ether (EHVE), diethyleneglycol divinyl ether (DGDVE) and 9-anthracenemethanol were obtained from Aldrich Chemical Company. 1,4-butanediol divinyl ether (BDVE), trimethyleneglycol trivinyl ether (TMPVE), cyclohexanedimethanol divinyl ether (CHDVE) and nonanediol divinyl ether (NDVE) were obtained from Nippon Carbide Industries, Co. Inc. 1,3-benzenedimethyl divinyl ether (BDMDVE) was synthesized from 1,3-benzenedimethanol, which was prepared in a two-liter, 3-necked round-bottomed flask equipped with a 500-ml constant pressure addition funnel, an overhead stirrer, a thermocouple and a nitrogen inlet into which was added 27 g (0.74 mol) of lithium aluminum hydride (95%) and 1000 ml of anhydrous tetrahydrofuran (THF). The addition funnel was charged with a solution of 100 g (0.493 mol) of isophthaloyl dichloride in 400 ml of anhydrous THF. Diacylchloride was added slowly over a period of 2 hours with cooling in an ice bath. Once addition was complete the ice bath was removed and the suspension allowed to reach room temperature for four hours at which time it was re-cooled and 200 ml of ethyl acetate was slowly added to decompose the remaining hydride. The addition funnel was recharged with 200 ml of 2M NaOH, which was then added slowly with vigorous stirring until the ensuing suspension became granular in appearance. The suspension was filtered and well washed with ethyl acetate. The combined filtrate and washings were then washed with brine, dried over anhydrous magnesium sulfate and evaporated on a rotary evaporator to yield 64 g (94%) of 1,3-benzenedimethanol as a clear, colorless oil which solidified upon standing. The BDMDVE was then prepared in a two-liter round bottomed flask equipped with a positive-pressure nitrogen inlet and a magnetic stir bar was added 64 g (0.46 mol) of 1,3-benzenedimethanol, 10 g (0.03 mol) of mercuric acetate and 1 liter of ethyl vinyl ether. The solution was stirred at room temperature for four days at which time it was washed well with saturated sodium bicarbonate solution and brine. The solution was then stirred for three days over 20 g of anhydrous magnesium sulfate (the reaction is driven to completion by stirring over the acidic magnesium sulfate), filtered, and evaporated on a rotary evaporator. The resulting oil was distilled twice through an 8" Vigreux to yield 53 g (60%) of BDMDVE, boiling point=84° C. at 1 mm Hg.

The chemical structures of the various vinyl ether compounds utilized in the resists were as follows.

CHVE

EHVE

BDVE

NDVE

DGDVE

TGDVE

TMPVE

CHDVE

BDMDVE

Example 1

In this example, solubility of different photoacid generators and 9-anthracenemethanol in various multifunctional vinyl ether crosslinkers and monofunctional vinyl ether reactive diluents were measured. Each photoacid generator was at a concentration of 38 millimoles per liter (mmol/l) and the 9-anthracenemethanol was at a concentration of 0.75 weight percent. The temperature of the solutions was elevated in a water bath to 50° C. and stored at 0° C. for 3 days. The photoacid generators included 2-[2,2,3,3,4,4,4-heptafluoro-1-(nonafluorobutylsulfonyloxoimino)-butyl]-fluorene, a photoacid generator commercially available under the trade name CGI 1906 from Ciba Specialty Chemicals, Inc. and 1,8-naphthalimidyl nonafluorobutanesulfonate, a photoacid generator commercially available under the trade name NAI-109 from Midori Kagaku Co., Ltd. Table 1 illustrates the results.

TABLE 1

| | Reactive Diluent | | 2-Functional crosslinker | | | | | 3-Functional crosslinker |
|---|---|---|---|---|---|---|---|---|
| | CHVE | EHVE | DGDVE | BDVE | NDVE | CHDVE | BDMDVE | TMPVE |
| CGI-1906 | RT | RT | RT | RT | RT | RT | RT | RT |
| NAI-109 | Insol. | Insol. | 50° C. | Insol. | Insol. | Insol. | Insol. | Insol. |
| 9-AntMeOH | 50° C. | Insol. | RT | 50° C. | 50° C. | 50° C. | 50° C. | Insol. |
| Saturation solubility (wt. %) | ~1 | ~0 | ~7 | ~1 | ~1 | ~1 | ~1 | ~0 |

RT—soluble at room temperature
50° C. - soluble at 50° C.
Insol.—Insoluble

Example 2

In this example, viscosity and volatility of various vinyl ethers were measured. Viscosity was measured using a TA Instruments AR2000EX. For these measurements, the temperature was held constant at 25° C. A cone plate geometry was used with a 40 millimeter plate. Volatility was measured using a Perkin Elmer TGS-2 Thermogravimetric Analyzer held at room temperature. The vinyl ether compound (4 μl) was placed in a tared pan and the sample weight recorded by computer continuously for a period of 10 minutes to obtain the weight loss at room temperature per unit time. The results are shown in Table 2.

TABLE 2

| Vinyl ether | Viscosity at 25° C. (cP) | Weight Loss (mg/sec) |
|---|---|---|
| CHVE | 1.126 | $7.06 \times 10^{-4}$ |
| EHVE | 0.944 | $2.38 \times 10^{-4}$ |
| DGDVE | 1.772 | $5.58 \times 10^{-5}$ |
| BDVE | 1.138 | $1.78 \times 10^{-4}$ |
| BDMDVE | 3.052 | $5.00 \times 10^{-7}$ |
| TMPVE | 3.707 | $2.40 \times 10^{-5}$ |
| CHDVE | 4.562 | $4.23 \times 10^{-6}$ |
| NDVE | 2.973 | $4.08 \times 10^{-6}$ |

The data show that the viscosity is less than 5 centipoise (cps) for all components of the coating composition and that the volatility is very low compared to common acrylate components, which was about 10 times higher.

Example 3

In this example, smoothness and film quality were analyzed for various vinyl ether resist formulations prepared in accordance with the present invention.

Freshly cleaned silicon substrates were first coated with 1 milliliter of o-(vinyloxybutyl)-n-(triethoxysilylpropyl)urethane adhesion promoter, placed in a covered basin for 45 seconds, and dried by spinning the wafer at 3,000 rpm for 60 seconds. An AlNx release layer was sputter deposited onto a quartz substrate. The silicon and quartz substrates were then placed in a glove box purged with dry nitrogen. The particular vinyl ether resist formulation was deposited onto the adhesion promoter of the silicon substrate and immediately covered with the quartz substrate such that the release layer was in direct contact with the vinyl ether resist formulation. The assemblies were removed from the glove box and immediately exposed to the filtered output of a 365 nm Hg lamp (Optical Associates, Inc.) at a dose of 220 mJ/cm². The AlNx release layer was measured to be completely transparent to the UV light.

Once cured, the quartz substrate was separated from the vinyl ether resist. The improved formulations yielded films free of cracks and buckling such as shown in FIG. 1, however their nanoscale roughness varied with composition. The morphologies of the cured resists were measured using a Veeco Dimension V scanning Probe Microscope in a tapping mode. The measurement was performed using a 333 kHz cantilever. The compositions and results are shown in Table 3, wherein the relative ratios of the crosslinker and diluent are shown in the composition column. Each vinyl ether resist formulation included one or more multifunctional vinyl ether crosslinkers, a monofunctional vinyl ether diluent, a photoacid generator, and a stabilizer. The photoacid generator in the composition was 2-[2,2,3,3,4,4,4-heptafluoro-1-(nonafluorobutylsulfonyloxoimino)-butyl]-fluorene commercially available under the trade name CGI 1906 from Ciba Specialty Chemicals at 2.5 wt % of the crosslinker and diluent. The stabilizer was 9-anthracenemethanol at 0.75 wt % of the crosslinker and diluent.

TABLE 3

| Crosslinker 1 | Crosslinker 2 | Diluent | Composition (weight ratio) | $R_{rms}$ (nm) |
|---|---|---|---|---|
| TMPVE | DGDVE | CHVE | 1/2/7 | 0.176 |
|  |  |  | 3/3/4 | 0.162 |
|  |  |  | 5/3/2 | 0.137 |
| TMPVE | DGDVE | EHVE | 1/3/6 | 0.256 |
|  |  |  | 3/3/4 | 0.198 |
|  |  |  | 5/3/2 | 0.156 |
| CHDVE | DGDVE | EHVE | 3/3/4 | 0.179 |
|  |  |  | 5/2/3 | 0.153 |
|  |  |  | 7/2/1 | 0.141 |
| DGDVE | — | EHVE | 3/7 | 0.398 |
|  |  |  | 5/5 | 0.309 |
|  |  |  | 7/3 | 0.222 |
|  |  |  | 9/1 | 0.152 |
| BDMDVE | — | EHVE | 7/3 | 0.122 |
|  |  |  | 9/1 | 0.120 |
| DGDVE | — | — | 10/0 | 0.309 |
| DGDVE | — | CHVE | 9.8/0.2 | 0.254 |

The surface roughness of the cured films is given in Table 3. Roughness values of less than 0.18 nanometers are of acceptable smoothness. By allowing use of the non-solvating liquid, formulations can be found that allow smoother films to be prepared than can be obtained using 100% DGDVE according to Table 3 and FIG. 1.

Example 4

In this example, adhesion energies of a CoNx release layer were measured for different resist formulations coated. The adhesion energies were measured using a DTS Delaminator operated in a double cantilever beam mode. Specimens were prepared using 2 bars, one silicon and one quartz, both 8 mm×65 mm. The quartz bar was precoated with the CoNx release layer by sputtering. The silicon bar was precoated with o-(vinyloxybutyl)-n-(triethoxysilylpropyl)urethane (Gelest) as an adhesion promoter. Both bars had a tab epoxied at one end, which was attached to the non-coated side of the bar. The bars were place in a glove box purged with dry nitrogen. 2-3 microliters of the selected organic vinyl ether resist were dropped onto the adhesion-promoter-coated side of the silicon bar, then immediately covered with the quartz bar such that the CoNx-coated side was in contact with the resist composition. The resist was allowed to spread evenly. The sandwich structure was removed from the glove box and immediately irradiated with output from the OAI mid-UV lamp as in Example 3 at a dose of 240 mJ/cm². The CoNx-coated film transmitted about 72% of the UV light. The tabbed ends were fixed into the delaminator grips and debonding measurements commenced immediately after cure. The delaminator was placed in room air at ambient humidity. The delaminator displacement rate was held constant at 2 micron/sec. Data were analyzed to obtain Gc (the critical energy release rate in J/m²), which is a measure of adhesion strength, using conventional beam mechanics well known to those skilled in the art. The organic vinyl ether resist formulations are shown in Table 4, wherein SVE1 is a comparative vinyl ether resist having 100% of a divinyl ether crosslinker.

TABLE 4

| Resist | Cross-linker 1 | Cross-linker 2 | Monofunctional VE | PAG + sensitizer/stabilizer |
|---|---|---|---|---|
| SVE1* | DGDVE (96.75) | — | — | CGI 1907 + 9-anthracenemethanol (3.25) |
| SVE2 | DGDVE (87.2) | — | CHVE (9.7) | CGI 1906 + 9-anthracenemethanol (3.1) |
| SVE3 | DGDVE (87.2) | — | EHVE (9.7) | CGI 1906 + 9-anthracenemethanol (3.1) |
| SVE4 | DGDVE (29.1) | — | CHVE (67.8) | CGI 1906 + 9-anthracenemethanol (3.1) |
| SVE5 | BDVE (87.2) | — | EHVE (9.7) | CGI 1906 + 9-anthracenemethanol (3.1) |
| SVE6 | BDMDVE (87.2) | — | EHVE (9.7) | CGI 1906 + 9-anthracenemethanol (3.1) |
| DVE1 | TMPVE (29.1) | DGDVE (29.1) | CHVE (38.8) | CGI 1906 + 9-anthracenemethanol (3.1) |
| DVE2 | TMPVE (48.4) | DGDVE (29.1) | EHVE (19.4) | CGI 1906 + 9-anthracenemethanol (3.1) |

*comparative resist formulation

The results are shown in Table 5. The Gc value for the vinyl ether resist having 100% of the divinyl ether crosslinker is included for comparison and debonded from a fluorosilane release layer. The fluorosilane release layer was prepared by depositing a 1 to 2 nm thick film onto a clean quartz plate using polymeric perfluoroether disilane formulation commercially available under the trade name FSD4500 from Cytonix Corporation. The data show that while the prior art and the improved formulations when used with the CoNx release layer have very low fracture energies, which is very desirable, only the improved formulations have both low fracture energies and acceptable smoothness.

TABLE 5

| Resist | Fluorosilane Adhesion Energy (J/m$^2$) | CoNx Adhesion Energy (J/m$^2$) |
|---|---|---|
| SVE1* | 5.6 | 0.268 |
| SVE2 | — | 0.347 |
| SVE3 | — | 0.260 |
| DVE1 | — | 0.377 |
| DVE2 | — | 0.346 |

*comparative data

Example 5

In this example, storage modulus for some of the vinyl ether resist formulations shown in Table 4 was measured to provide an indication of the resistance of a cured film to deformation. Storage modulus was measured about 100 nanometers below the cured film surface using an MTS XP nanoindenter operating at 45 Hz and a Berkovitch tip. The results are shown in Table 6 below, which show values of about 3 to about 6 GPa. As reference, prior art nanoimprint resist films using acrylates that are cured using free radical chemistry generally have a storage modulus of about 2 to about 4 GPa. This shows that the improved films are of acceptable modulus for serving as nanoimprint materials.

TABLE 6

| Resist | Storage Modulus, E' (GPa) Std. Dev. 0.08 GPa |
|---|---|
| SVE2 | 3.10 |
| SVE3 | 3.00 |
| SVE4 | 3.51 |
| SVE5 | 3.18 |
| SVE6 | 5.52 |
| DVE1 | 4.03 |
| DVE2 | 3.88 |

The flow diagram in FIG. 2 is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

The foregoing description of the embodiments of this invention has been presented for purposes of illustration and description. It is not intended to be exhaustive or to limit the invention to the precise form disclosed, and many modifications and variations are possible. Such modifications and variations that may be apparent to a person skilled in the art are intended to be included within the scope of this invention as defined by the accompanying claims.

What is claimed is:

1. A coating composition for imprint lithography comprising:
   at least one organic vinyl ether crosslinker having at least three vinyl ether groups, wherein the total crosslinker in the composition is 28.2 to 29.9 or 47.0 to 49.9 percent by weight;
   at least one diluent comprising a monofunctional vinyl ether compound; and
   at least one photoacid generator soluble in a selected one or both of the at least one mono functional vinyl ether compound and the at least one organic vinyl ether crosslinker having the at least three vinyl ether groups, wherein the least one monofunctional vinyl ether compound and the at least one vinyl ether crosslinker having the at least three vinyl ether groups are free from silicon and fluorine substituents, wherein the composition has a viscosity of less than or equal to 100 centipoise at 295° Kelvin.

2. The coating composition of claim 1, further comprising at least one stabilizer.

3. The coating composition of claim 2, wherein the stabilizer comprises at least one of 9-anthracenemethanol, a substituted 9-anthracenemethanol having the structure (VIII), phenothiazine, or a substituted phenothiazine having the structure (IX):

(VIII)

(IX)

wherein each R is independently selected from the group consisting of a hydrogen atom and a substituted or non-substituted hydrocarbyl substituent, said hydrocarbyl group selected from the group consisting of an alkyl group having 1 to 20 carbon atoms, an alkenyl group having 1 to 20 carbon atoms, an alkynl group having 1 to 20 carbon atoms, an aralkyl group having 1 to 20 carbon atoms, an alkaryl having 1 to 20 carbon atoms and an aryl group having 1 to 20 carbon atoms; where, the alkyl groups of the aralkyl and the alkaryl groups may be linear, branched or cyclic and the aryl groups may include at least one carbon ring containing 3 to 8 carbon atoms; and where any two R in the same molecule may be linked to form the at least one carbon ring containing 3 to 8 carbon atoms.

4. The coating composition of claim 1, wherein the viscosity is less than or equal to 15 centipoise at 295° Kelvin.

5. The coating composition of claim 1, further comprising at least one vinyl ether crosslinker having at least two vinyl ether groups comprises one of or more of the following structures:

$$C(R^6)(R^7)=C(R^8)OC(R^9)(R^{10})[C(R^{11})(R^{12})]_n[C(R^{13})(R^{14})OC(R^{15})=C(R^{16})(R^{17})] \quad (II)$$

$$C(R^{18})(R^{19})=C(R^{20})OC(R^{21})(R^{22})[[C(R^{23})(R^{24})]_pO[C(R^{25})(R^{26})]_q]_rC(R^{27})(R^{28})OC(R^{29})=C(R^{30})(R^{31}) \quad (III)$$

$$\{C(R^{32})(R^{33})=C(R^{34})OC(R^{35})(R^{36})[[C(R^{37})(R^{38})]_s[C(R^{39})(R^{40})]_tOC(R^{41})(R^{42})]_u\}_v\}_w[A] \quad (IV)$$

wherein each m is represented by an integer from 1 to 20, each n is represented by integers from 1 to 10, each p is represented by an integer from 1 to 10, each q is represented by an integer from 1 to 10, each r is represented by an integer from 1 to 10, each s is represented by an integer from 0 to 10, each t is represented by an integer from 1 to 10, each u is represented by an integer from 1 to 10, each v is represented by an integer from 0 to 10, and each w is represented by an integer from 3 to 6, wherein each $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$, $R^{38}$, $R^{39}$, $R^{40}$, $R^{41}$, and $R^{42}$ may be independently at each occurrence a hydrogen atom or a substituted or non-substituted hydrocarbyl substituent, and wherein the A group is an aromatic group.

6. The coating composition of claim 5, wherein the hydrocarbyl substituent is selected from the group consisting of a linear alkyl or a linear alkoxy group having 1-6 carbon atoms, a branched alkyl or branched alkoxy group having 2-12 carbon atoms, a cycloalkyl, a bicycloalkyl, an aryl group, an aralkyl group, an alkaryl group, an alkenyl group, a cycloalkenyl group, an alkalkenyl group, an alkenylalkyl group, an alkynyl group, an alkalkynyl group, and an alkynylalkyl group.

7. The coating composition of claim 1, wherein the at least one diluent comprising a mono functional vinyl ether compound is represented by the following structure:

$$C(R^1)(R^2)=C(R^3)O[C(R^4)(R^5)]_m,$$

wherein each $R^1$, $R^2$, $R^3$, $R^4$, and $R^5$ is independently at each occurrence a hydrogen atom or a substituted or non-substituted hydrocarbyl substituent, and wherein m is an integer from 1 to 20.

8. The coating composition of claim 1, wherein at least one of the crosslinker and the diluent has a carbon backbone arranged in a cyclic structure.

9. A coating composition for imprint lithography comprising:
at least one aliphatic vinyl ether crosslinker having at least two vinyl ether groups, wherein the total crosslinker in the composition is 28.2 to 29.9 or 47.0 to 49.9 weight percent;
at least one diluent comprising a monofunctional vinyl ether compound; and
at least one photoacid generator soluble in a selected one or both of the at least one mono functional vinyl ether compound and the at least one aliphatic vinyl ether crosslinker, wherein the at least one monofunctional vinyl ether compound and the at least one aliphatic vinyl ether crosslinker are free from silicon and fluorine substituents, and wherein the composition has a viscosity of less than or equal to 100 centipoise at 295° Kelvin.

10. The coating composition of claim 9, wherein the at least one diluent is at least 5 weight percent of the total weight of the crosslinker and the diluent.

11. The coating composition of claim 9, wherein the viscosity is less than or equal to 15 centipoise at 295° Kelvin.

12. The coating composition of claim 9, further comprising at least one stabilizer.

13. The coating composition of claim 9, wherein at least one of the crosslinker and the diluent has a carbon backbone arranged in a cyclic structure.

* * * * *